US008714806B2

(12) United States Patent
Naoi et al.

(10) Patent No.: US 8,714,806 B2
(45) Date of Patent: May 6, 2014

(54) COUPLING APPARATUS AND KNEADING EQUIPMENT HAVING KNEADING APPARATUS AND DRIVE APPARATUS COUPLED TOGETHER THROUGH THE COUPLING APPARATUS

(75) Inventors: Masaki Naoi, Takasago (JP); Toshio Ujihara, Takasago (JP); Katsunobu Hagiwara, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 526 days.

(21) Appl. No.: 12/302,809

(22) PCT Filed: Jun. 5, 2007

(86) PCT No.: PCT/JP2007/061360
§ 371 (c)(1),
(2), (4) Date: Nov. 28, 2008

(87) PCT Pub. No.: WO2008/012991
PCT Pub. Date: Jan. 31, 2008

(65) Prior Publication Data
US 2009/0238029 A1  Sep. 24, 2009

(30) Foreign Application Priority Data

Jul. 27, 2006  (JP) ................ 2006-204693
Sep. 21, 2006  (JP) ................ 2006-255954

(51) Int. Cl.
*B29B 7/00* (2006.01)
(52) U.S. Cl.
USPC .................. 366/100; 464/16; 464/154
(58) Field of Classification Search
USPC ............ 366/100; 464/16, 153, 154, 158, 159
See application file for complete search history.

(56) References Cited

U.S. PATENT DOCUMENTS 3,117,430 A  1/1964 Mueller
4,443,205 A *  4/1984 Grant ........................ 464/16
(Continued)

FOREIGN PATENT DOCUMENTS

GB  2 101 270 A  1/1983
JP  48 27296  8/1973
(Continued)

OTHER PUBLICATIONS

Office Action issued Jan. 13, 2011, in Korea Patent Application No. 10-2008-7032049 (with English translation).

(Continued)

*Primary Examiner* — James Sanders
(74) *Attorney, Agent, or Firm* — Oblon, Spivak, McClelland, Maier & Neustadt, L.L.P.

(57) ABSTRACT

An input shaft of a sealed kneading apparatus and an output shaft of a drive apparatus can be coupled together in a mutually eccentric state of both shafts and the apparatus life is prolonged.

A coupling apparatus 6 for coupling between an input shaft 16 of a batch type kneading apparatus 1 and an output shaft 19 of a drive apparatus 2 for driving the kneading apparatus 1, the coupling apparatus 6 comprising a gear coupling section 5, the gear coupling section 5 being capable of coupling the input shaft 16 of the batch type kneading apparatus 1 and the output shaft 19 of the drive apparatus 2 with each other in a mutually eccentric state of both shafts, gears 24 meshing with other so as to slide relatively in the face width direction with rotation of the gear coupling section 5, and an oil bath type lubricating section 46 for lubricating the gears 24.

11 Claims, 7 Drawing Sheets

(56) References Cited

U.S. PATENT DOCUMENTS

| | | |
|---|---|---|
| 5,679,076 A | 10/1997 | Shigeura |
| 5,979,207 A | 11/1999 | Seidl et al. |

FOREIGN PATENT DOCUMENTS

| | | |
|---|---|---|
| JP | 48-27296 | 8/1973 |
| JP | 48-27296 Y * | 8/1973 |
| JP | 61 17559 | 2/1986 |
| JP | 61-17559 U | 2/1986 |
| JP | 63-062918 | 3/1988 |
| JP | 63 62918 | 3/1988 |
| JP | 2-275117 | 11/1990 |
| JP | 7 286622 | 10/1995 |
| JP | 8-61450 | 3/1996 |
| JP | 10-044145 | 2/1998 |
| JP | 10 44145 | 2/1998 |
| JP | 10 267113 | 10/1998 |
| JP | 10-267113 | 10/1998 |
| JP | 10-328718 | 12/1998 |
| JP | 2000 64980 | 3/2000 |
| JP | 2000-064980 | 3/2000 |
| JP | 2001 141032 | 5/2001 |
| JP | 2001-141032 | 5/2001 |
| JP | 2001-323999 | 11/2001 |
| JP | 2001 323999 | 11/2001 |
| JP | 2004 313927 | 11/2004 |
| JP | 2004-313927 | 11/2004 |

OTHER PUBLICATIONS

Office Action issued Aug. 11, 2010, in China Patent Application No. 200780020457.7, filed Jun. 5, 2007, with English translation.

Office Action issued Mar. 17, 2009 in Japan Application No. 2006-204693 (English Translation Previously Filed).

Office Action issued Oct. 26, 2012 in Korean Patent Application No. 10-2011-7005941 (with English translation).

Korean Office Action issued Mar. 16, 2012, in Patent Application No. 10-2011-7005941 (with English-language translation).

The Extended European Search Report issued Mar. 26, 2013, in Application No. / Patent No. 07744712.6-1751 / 2048394 PCT/JP2007061360.

Australian Office Action Issued Apr. 27, 2013 in Patent Application No. 2012200717.

* cited by examiner

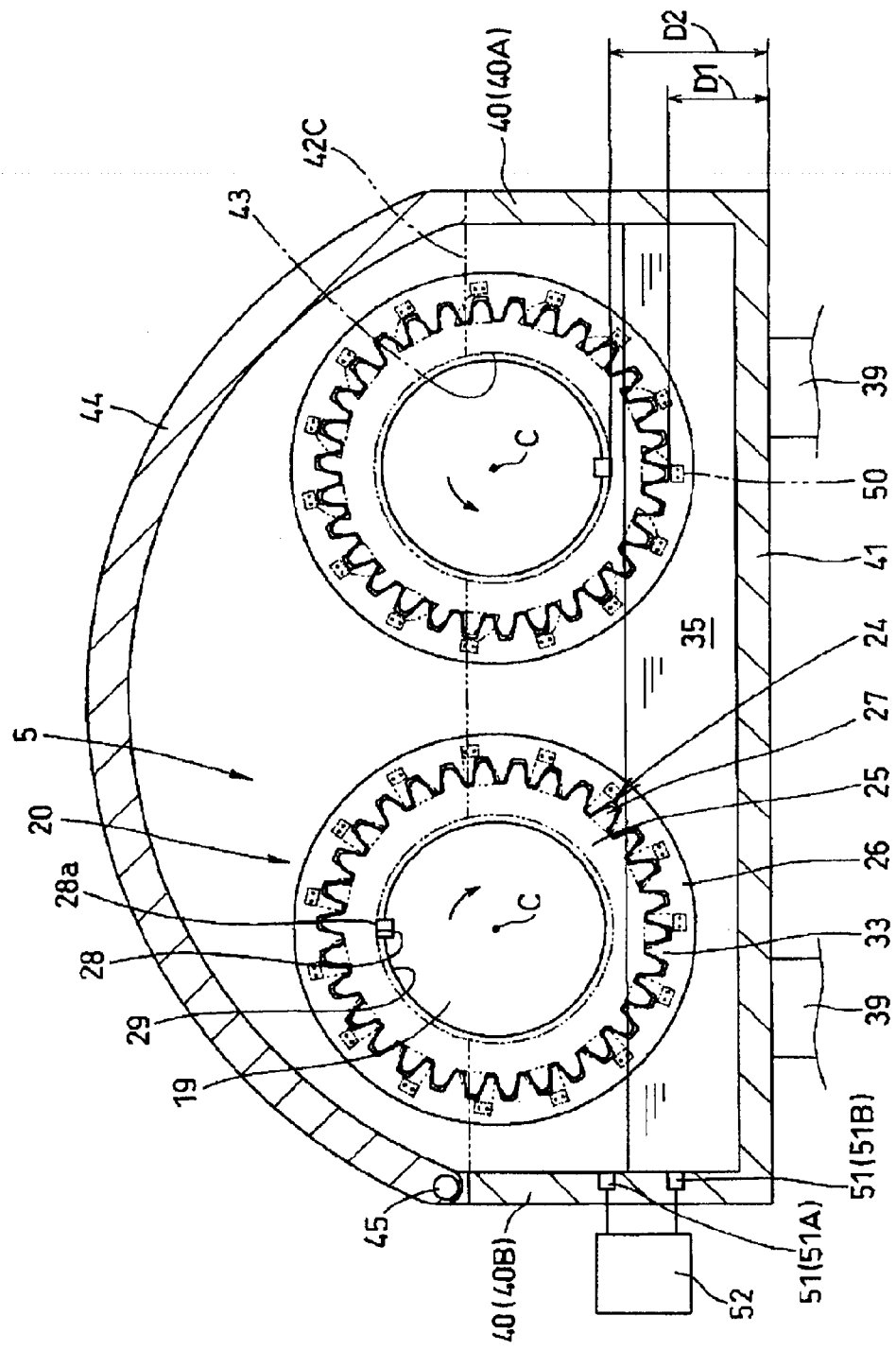

COUPLING APPARATUS AND KNEADING EQUIPMENT HAVING KNEADING APPARATUS AND DRIVE APPARATUS COUPLED TOGETHER THROUGH THE COUPLING APPARATUS

FIELD OF ART

The present invention relates to a coupling apparatus and kneading equipment having a kneading apparatus and a drive apparatus coupled together through the coupling apparatus.

BACKGROUND ART

Heretofore, as a kneading apparatus for kneading a material to be kneaded such as, for example, rubber or plastic, one disclosed in Patent Literature 1 has been known. This conventional kneading apparatus is a double-arm type and is driven by a drive apparatus disposed near the kneading apparatus.

More particularly, the kneading apparatus in question is provided with an externally projecting input shaft, while the drive apparatus is provided with an externally projecting output shaft. The input shaft of the kneading apparatus and the output shaft of the drive apparatus are coupled together through a coupling apparatus having gear coupling portions. With this coupling, power from the drive apparatus is transmitted to the kneading apparatus.

[Patent Literature 1]
Japanese Patent Laid-Open Publication No. 2004-313927

DISCLOSURE OF THE INVENTION

It is an object of the present invention to provide a coupling apparatus suitable for coupling between the aforesaid drive apparatus and an apparatus to be driven in accordance with the power of the drive apparatus.

The present invention adopts the following means to achieve the above-mentioned object.

In one aspect of the present invention there is provided a coupling apparatus for coupling between an input shaft of a to-be-driven apparatus and an output shaft of a drive apparatus for driving the to-be-driven apparatus, the coupling apparatus comprising a gear coupling section and a lubricating section, the gear coupling section having at least a pair of gears meshing with each other so as to permit transfer of a driving force from the output shaft to the input shaft in a mutually eccentric state of the input shaft and the output shaft, the lubricating section being capable of supplying a lubricant between the gears, the gears being in mesh with each other so as to slide relatively in a face width direction with rotation of the input shaft.

According to this structure the input shaft and the output shaft of the drive apparatus can be coupled together by the gear coupling section even in a mutually eccentric state of both shafts. Moreover, since a lubricant is supplied between the gears in the gear coupling section, even if a large power is transmitted to the input shaft and the output shaft in a mutually eccentric state of both shafts, seizing or the like of the gears does not occur and it is possible to prevent shortening of the life.

In another aspect of the present invention there is provided a coupling apparatus having a gear coupling section for coupling an output shaft of a drive apparatus and an input shaft of a to-be-driven apparatus with each other, the gear coupling section comprising a pair of first cylindrical bodies, the pair of first cylindrical bodies being fitted on the input shaft of the to-be-driven apparatus and the output shaft of the drive apparatus respectively and each having a first gear on an outer periphery surface thereof, a pair of second cylindrical bodies, the pair of second cylindrical bodies being loosely fitted on the pair of first cylindrical bodies and having second gears on inner surfaces thereof respectively, the second gears meshing with the pair of first gears respectively, and a coupler for coupling the second cylindrical bodies with each other detachably, an axial length of each of the second cylindrical bodies and that of the coupler being each set shorter than the distance between an end face of the input shaft and that of the output shaft so that the second cylindrical bodies and the coupler can be pulled out from between the end faces.

According to this structure, in a fixed state of the to-be-driven apparatus and the drive apparatus to respective predetermined positions without moving the to-be-driven apparatus or the drive apparatus it is possible to pull out the second cylindrical bodies and the coupler and the second cylindrical bodies can be replaced in a very simple manner. In other words, the second cylindrical bodies can be replaced without changing a relative position between the to-be-driven apparatus and the drive apparatus and re-positioning of both apparatus is not necessary.

BRIEF DESCRIPTION OF THE DRAWINGS

FIG. 6 is a sectional view taken on line B-B in FIG. 4.

BEST MODE FOR CARRYING OUT THE INVENTION

An embodiment of the present invention will be described below with reference to the drawings.

Figure 1:
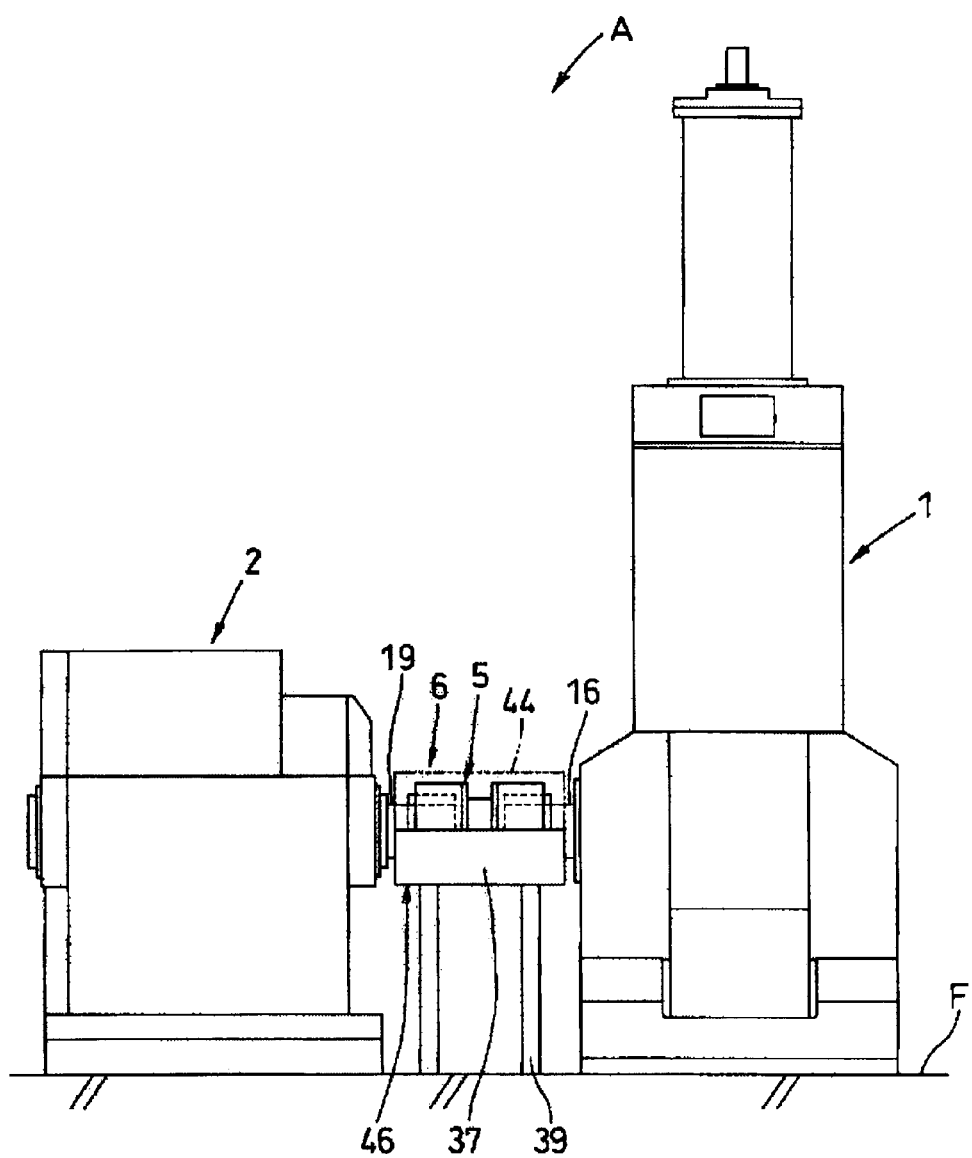
FIG. 1 is a front view of equipment with a drive apparatus and a to-be-driven apparatus coupled together.
Figure 2:
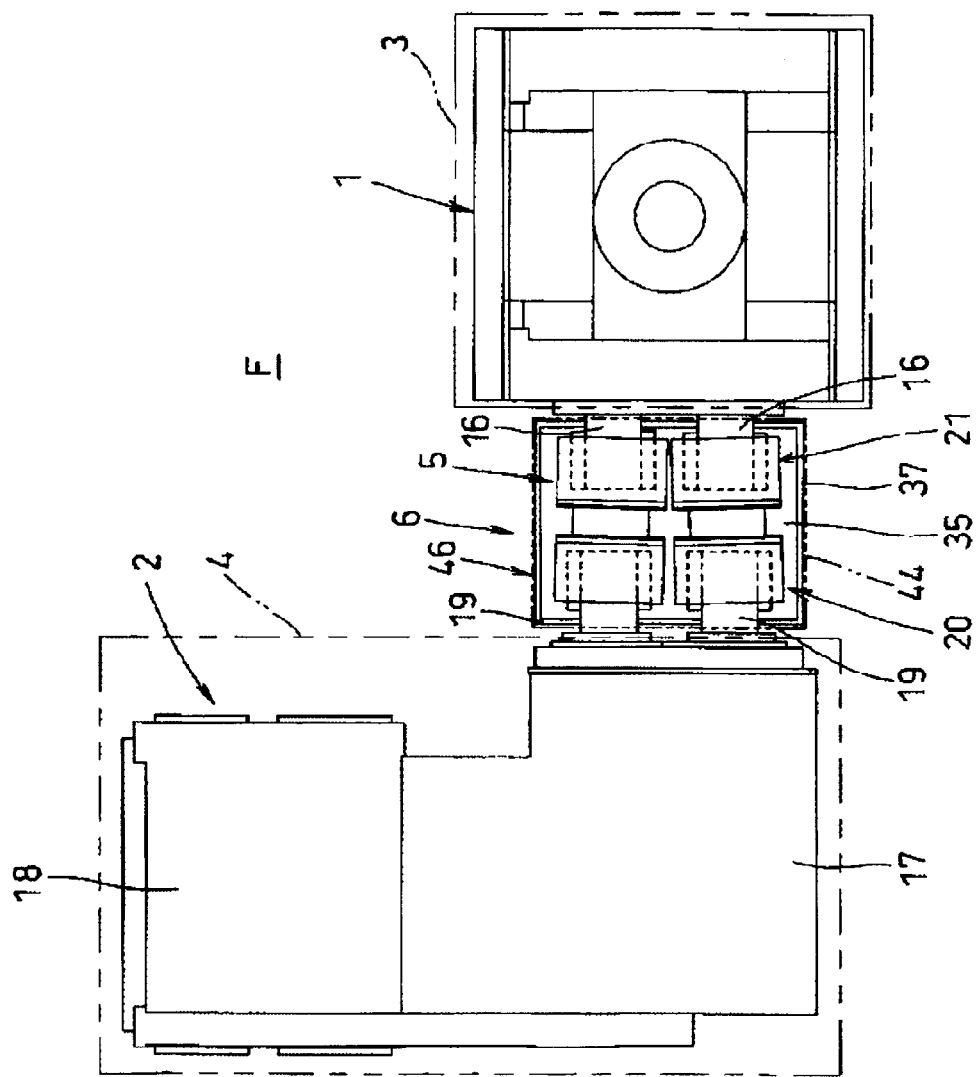
FIG. 2 is a plan view of the equipment with the drive apparatus and the to-be-driven apparatus coupled together.

FIG. 1 is a front view of equipment with a drive apparatus and a to-be-driven apparatus coupled together. FIG. 2 is a plan view of the equipment with the drive apparatus and the to-be-driven apparatus coupled together.

Kneading equipment A includes a sealed (batch type) kneading apparatus 1 for kneading a material to be kneaded such as, for example, rubber or plastic, a drive apparatus 2, and a coupling apparatus 6 for coupling the batch type kneading apparatus 1 and the drive apparatus 2 with each other.

As shown in FIGS. 1 and 2, a sealed kneading apparatus, which is an example of the sealed kneading apparatus 1, is a stationary type installed on an installation floor F or the like. The drive apparatus 2 is a stationary type installed on the installation floor F or the like.

For example, on the installation floor F, as shown in FIG. 2, a first installation area 3 for installation of the sealed kneading apparatus 1 and a second installation area 4 for installation of the drive apparatus 2 are determined.

The sealed kneading apparatus 1 is installed so as to be received within the first installation area 3, while the drive apparatus 2 is installed so as to be received within the second installation area 4. On the installation floor F, the first installation area 3 and the second installation area 4 are provided in parallel with each other.

The sealed kneading apparatus 1 installed in the first installation area 3 and the drive apparatus 2 installed in the second installation area 4 are connected together by a coupling apparatus 6 having gear coupling sections 5.

Figure 3:
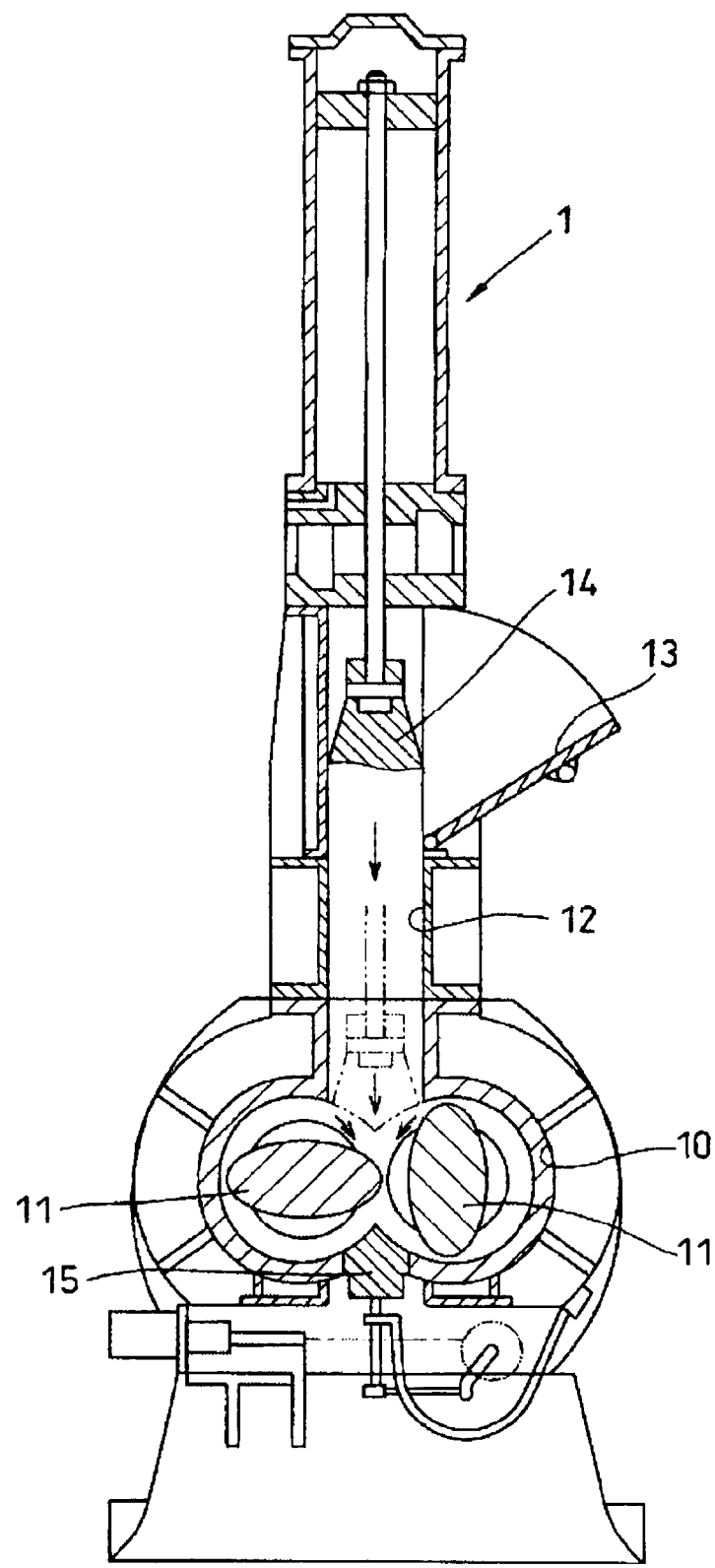
FIG. 3 is a schematic structure diagram of a sealed kneading apparatus.

As shown in FIG. 3, the sealed kneading apparatus 1, which is for kneading a material to be kneaded such as, for example, rubber or plastic, includes a sealed kneading chamber 10, two rotors 11 for rotationally kneading a to-be-kneaded material received within the kneading chamber 10, and a hopper 12 disposed above the kneading chamber 10 to introduce the to-be-kneaded material into the kneading chamber.

The hopper 12 is provided with an inlet port 13 through which the to-be-kneaded material can be introduced together with an additive or the like. A floating weight 14 for pushing in the to-be-kneaded material toward the kneading chamber 10 is provided vertically movably within the hopper 12. In the kneading chamber 10 is provided a drop door 15 for taking out the material after kneading.

As shown in FIG. 2, the rotors 11 are provided with input shafts 16, respectively, for rotating the rotors. The input shafts 16 project in the same direction sideways of the kneading chamber 10 toward the exterior.

The drive apparatus 2, which is for driving the sealed kneading apparatus 1, is made up of a reduction mechanism 17 and a drive motor 18. The reduction mechanism 17 divides the power of the drive motor 18 into two systems, causing the rotors 11 of the sealed kneading apparatus 1 to rotate in directions different from each other. More specifically, two output shafts 19 project outwards from one side of the reduction mechanism 17 and rotate in directions different from each other.

For kneading the to-be-kneaded material by the sealed kneading apparatus 1 and the drive apparatus 2, first the to-be-kneaded material is introduced together with an additive or the like through the inlet port 13 and the to-be-kneaded material and the additive or the like are press-fitted into the sealed kneading chamber 10 by a push-in action of the floating weight 14.

Next, the drive apparatus 2 is operated in a sealed state of the kneading chamber 10. At this time, the power of the output shafts 19 in the drive apparatus 2 is transmitted to the input shafts 16 through the coupling apparatus 6, causing rotation of the rotors 11. The rotors 11 rotate while sweeping an inner wall of the kneading chamber 10, whereby the to-be-kneaded material press-fitted into the kneading chamber 10 is kneaded together with the additive or the like. After the kneading is over in the sealed kneading apparatus 1, the material thus kneaded can be discharged to the exterior by opening the drop door 15.

A detailed description will be given below about the coupling apparatus 6 which is for coupling between the sealed kneading apparatus 1 and the drive apparatus 2.

Figure 4:
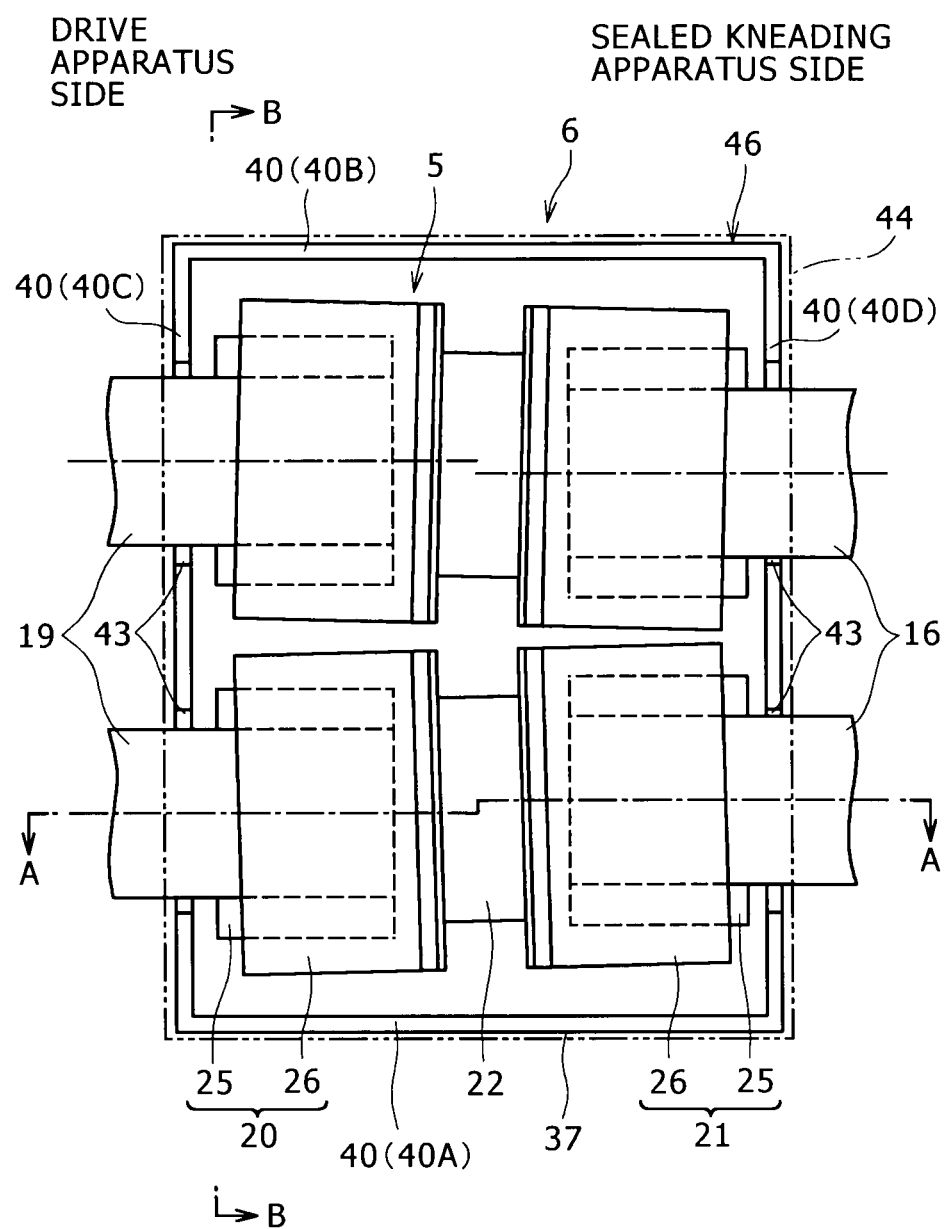
FIG. 4 is a plan view of a coupling apparatus.
Figure 5:
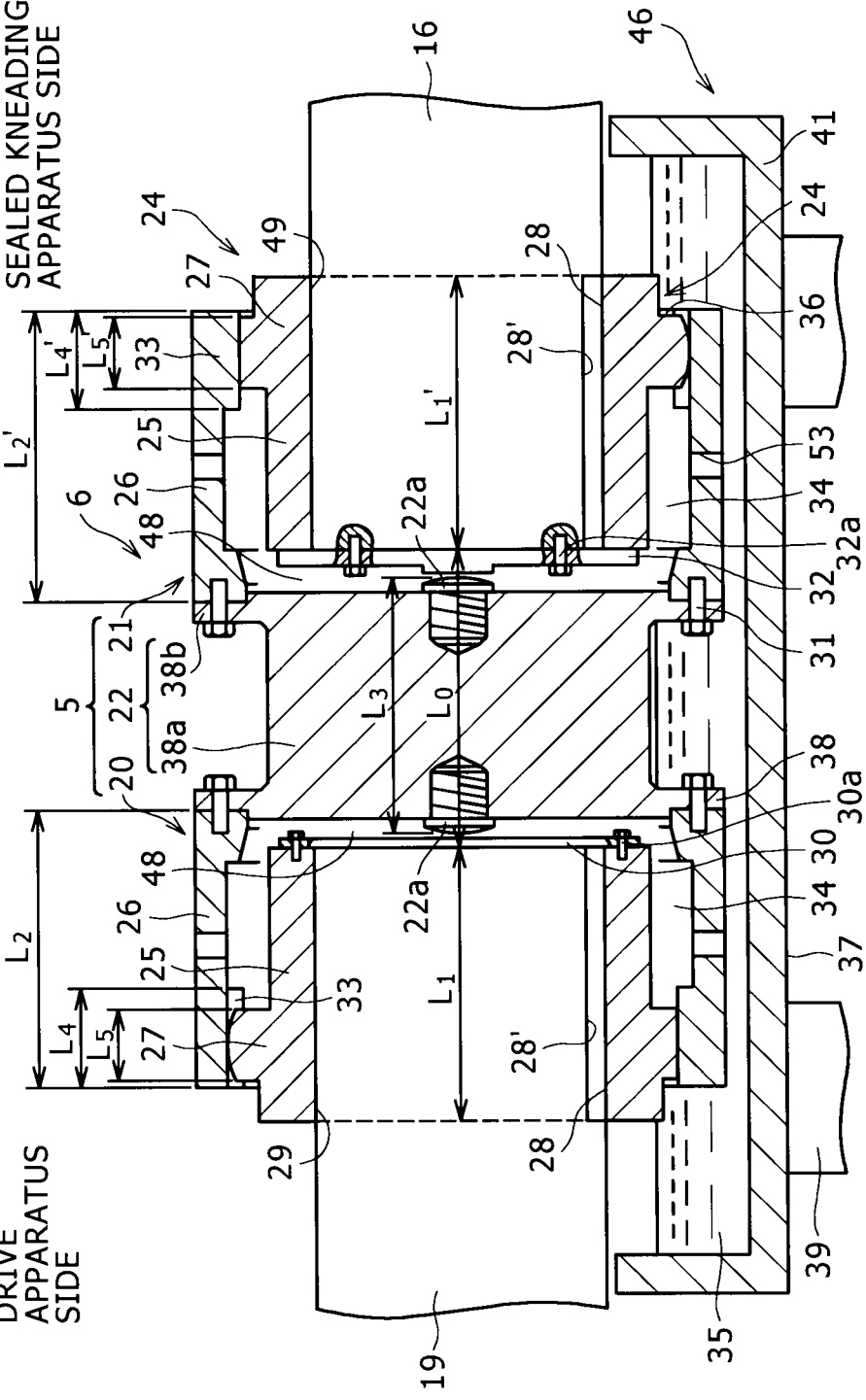
FIG. 5 is a sectional view taken on line A-A in FIG. 4.

As shown in FIGS. 4 to 6, the coupling apparatus 6 includes a gear coupling section 5 for coupling the input shafts 16 of the sealed kneading apparatus 1 and the output shafts 19 of the drive apparatus 2 with each other, and a lubricating section 46 for lubricating gears 24 of the gear coupling sections 5.

The gear coupling sections 5 are constituted by gear-shaped couplings, which can couple the input shafts 16 of the sealed kneading apparatus 1 and the output shafts 19 of drive apparatus 2 with each other in a mutually eccentric state of both shafts.

The gear coupling sections 5 each have such a structure as is divided in two and each include a first divided unit 20, a second divided unit 21, and a coupler 22 for coupling the first divided unit 20 and the second divided unit 21 with each other.

The first divided unit 20 and the second divided unit 21 each include a first cylindrical body 25 and a second cylindrical body 26. On an external surface of the first cylindrical body 25, there is formed a first gear 27 (hereinafter may be referred to as "external teeth 27"), while a key way 28 is formed in an inner periphery surface of the first cylindrical body 25.

The first cylindrical body 25 of the first divided unit 20 is formed with an insertion hole 29 for insertion therein of the associated output shaft 19 of the drive apparatus 2 and the output shaft 19 is fitted in the insertion hole 29. By fitting a fixing piece 28a between a key way 28' formed in an outer periphery surface of the output shaft 19 and the key way 28 formed in the inner periphery surface of the first cylindrical body 25, the output shaft 19 is fixed so as to be rotatable integrally with the first cylindrical body 25 (see FIGS. 5 and 6). A plate 30 is attached to one axial side (the coupler 22 side) of the first divided unit 20 through clamping means 30a so as to close the insertion hole 29.

An insertion hole 49 for insertion therein of the associated input shaft 16 of the sealed kneading apparatus 1 is formed in the first cylindrical body 25 of the second divided unit 21 and the input shaft 16 is fitted in the insertion hole 49. By fitting a fixing piece between a key way 28' formed in an outer periphery surface of the input shaft 16 and a key way 28 formed in an inner periphery surface of the first cylindrical body 25, the input shaft 16 is fixed so as to be rotatable integrally with the first cylindrical body 25. Further, a plate 32 is attached to a front end (the coupler 22 side) in the axial direction of the input shaft 16 through clamping means 32a.

The second cylindrical body 26 is larger in outside diameter than the first cylindrical body 25 and a second gear (hereinafter may be referred to as "internal teeth 33") meshing with the external teeth 27 is formed on an inner periphery surface of the second cylindrical body 26.

The hardness of the internal teeth 33 of the second cylindrical body 26 is set lower than that of the external teeth 27 of the first cylindrical body 25, whereby the internal teeth 33 of the second cylindrical body 26 can be worn out earlier than the external teeth 27 of the first cylindrical body 25. That is, the second cylindrical body 26 to be pulled out is worn out selectively (in other words, wear of the external teeth 27 of the first cylindrical body 25 is delayed).

The external teeth 27 and the internal teeth 33 are formed in shapes taking into account a sliding motion between both teeth caused by an eccentric state between the input shaft 16 and the output shaft 19. For example, when seen sideways in the section of FIG. 5, a mountain portion, i.e., a crest portion, of each external tooth 27 is arcuate in the face width direction.

The width of each internal tooth 33 is set taking into account an allowance for slide (allowance for movement) so that the position of contact between an internal tooth 33 and an external tooth 27 can shift in the face width direction while the external tooth 27 slides with respect to the internal tooth 33. More specifically, face widths L4, L4' of the internal teeth 33 are set larger than face widths L5, L5' of the external teeth 27.

In the first divided unit 20, the second cylindrical body 26 is loosely fitted on the first cylindrical body 25, and the internal teeth 33 of the second cylindrical body 26 and the external teeth 27 of the first cylindrical body 25 are in mesh with each other. In the second divided unit 21, the second cylindrical body 26 is loosely fitted on the first cylindrical body 25, and the internal teeth 33 of the second cylindrical body 26 and the external teeth 27 of the first cylindrical body 25 are in mesh with each other.

In a state in which the external teeth 27 of the first cylindrical body 25 and the internal teeth 33 of the second cylindrical body 26 are in mesh with each other, a first clearance 34 is formed between the outer periphery surface of the first cylindrical body 25 and the inner periphery surface of the second cylindrical body 26. The first clearance 34 on a base end side of the first and second cylindrical bodies 25, 26 is used as an inlet port 36 for admission of lubricating oil 35. Lubricating oil 35 present within an oil case 37 to be described later is adapted to pass the inlet port 36 and reach the internal teeth 33 and the external teeth 27.

The coupler 22 is for coupling between the first divided unit 20 and the second divided unit 21 and is disposed between both divided units 20, 21. The coupler 22 is made up of a columnar, small-diameter portion 38a smaller than the outside diameter of the second cylindrical body 26 and flange portions 38b projecting radially outwards from both ends in the right and left direction of the small-diameter portion 38a.

The coupler 22 includes thrust pins 22a formed centrally of both end faces in the right and left direction and having spherical projecting ends respectively to restrict an axial relative movement between each first cylindrical body 25 and the associated gear coupling section 5 upon abutment against the plate 30 or 32.

As shown in FIG. 5, when the length (distance) of a gap portion formed between both end faces of the input shaft 16 and the output shaft 19 is assumed to be L0, axial lengths L1, L1' of the first cylindrical bodies 25, axial lengths L2, L2' of the second cylindrical bodies 26 and an axial length L3 (including the thrust pins 22a) of the coupler 22 are each set shorter than the distance L0 between both end faces, i.e., L0>L1, L1', L0>L2, L2'. In this embodiment, the axial length L1 and L1' of the first cylindrical bodies 25, the axial lengths L2 and L2' of the second cylindrical bodies 26 and the axial length L3 of the coupler 22 are each smaller than the distance between end faces of the input and output shafts 16, 19, but the axial lengths L1, L1', L2, L2' and L3 may each be made smaller than the distance (plate-to-plate distance) between the plates 30 and 32.

For coupling each input shaft 16 in the sealed kneading apparatus 1 and the associated output shaft 19 in the drive apparatus 2, first, the first cylindrical bodies 25 having respective lengths L1 and L1' shorter than the distance L0 of a gap portion is fitted on the input and output shafts 16, 19 through the gap portion formed between both end faces of the input and output shafts 16, 19, and the second cylindrical bodies 26 having respective lengths L2 and L2' shorter than the distance L0 of the gap portion are fitted in the first cylindrical bodies 25 respectively, allowing the external teeth 27 and the internal teeth 33 to be meshed with each other.

Then, the small-diameter portion 38a (coupler 22) of the coupler 22 (including the thrust pins 22a) having a length L3 set shorter than the distance between both end faces of the input and output shafts 16, 19 is disposed between the first and second divided units 20, 21, allowing the flange portions 38b to be abutted against the front end sides of the second cylindrical bodies 26, and the flange portions 38b and the second cylindrical bodies 26 are clamped together with clamping means 31, e.g., bolts.

In this way the input shaft 16 and the output shaft 19 can be coupled together. In the coupling operation it is not necessary to move the sealed kneading apparatus 1 and the drive apparatus 2 from their stationary state, nor is it necessary to mount the associated coupling section 5 prior to coupling with the input shaft 16 or the output shaft 19.

As shown in FIG. 4, even in the case where the axis of each input shaft 16 and that of the associated output shaft 19 are eccentric to each other when coupling both shafts, both shafts can be coupled together by the associated gear coupling section 5.

With the first and second divided units 20, 21 coupled together, second clearances 48 communicating with the first clearances 34 formed between the first and second cylindrical bodies 25, 26 are formed between the second cylindrical bodies 26 and the plates 30, 32.

On the other hand, for removing the second cylindrical bodies 26 after coupling the input and output shafts 16, 19 by the coupling section 5, first the clamping means 31 of the coupler 22 are loosened and the coupler 22 is removed from the second cylindrical bodies 26. At this time, since the internal teeth 33 are slidable in the face width direction with respect to the external teeth 27, the second cylindrical bodies 26 are slid in the axial direction, whereby the coupler 22 can be removed easily.

After removal of the coupler 22, one second cylindrical body 26 (or example, the one located on the first divided unit 20 side) is moved in a direction away from the output shaft 19 and is thereby removed from the associated first cylindrical body 25. Further, the clamping means 32a and the plate 32 are removed and the other second cylindrical body 26 (for example, the one located on the second divided unit 21 side) is moved in a direction away from the input shaft 16 and is thereby removed from the associated first cylindrical body 25.

At this time, since the axial lengths L2 and L2' of the second cylindrical bodies 26 are set shorter than the distance L0 between both end faces, the second cylindrical bodies 26 of the first and second divided units 20, 21 can be removed to the exterior from between both end faces.

The first cylindrical bodies 25 are removed in the following manner. After the second cylindrical 26 is removed, one first cylindrical body 25 is moved in a direction away from the output shaft 19 and is thereby removed from the output shaft 19.

Likewise, the other first cylindrical body 25 is moved in a direction away from the input shaft 16 and is thereby removed from the input shaft 16.

At this time, since the axial lengths L1 and L1' of the first cylindrical bodies 25 are set shorter than the distance L0 between both end faces, the first cylindrical bodies 25 of the first and second divided units 20, 21 can be removed to the exterior from between both end faces.

Thus, according to this coupling apparatus, since the axial lengths L2, L2' and L3 of the second cylindrical bodies 26 and the coupler 22 are set shorter than the distance L0 between both end faces, the second cylindrical bodies 26 and the coupler 22 can be pulled out even without moving the sealed kneading apparatus 1 or the drive apparatus 2 from the stationary state.

Further, since the axial lengths L1 and L1' of the first cylindrical bodes 25 are set shorter than the distance L0 between both end faces, the first cylindrical bodies 25 can be pulled out even without moving the sealed kneading apparatus 1 or the drive apparatus 2 from the stationary state.

The lubricating section 46 is for lubricating the gears 24 of the gear coupling sections, namely, the outer teeth 27 of the first cylindrical bodies 25 and the inner teeth 33 of the second cylindrical bodies 26 and it has an oil case 37 for the storage of lubricating oil 35.

The oil case 37 is formed in the shape of a rectangular, bottomed vessel when seen in plan and is disposed under the gear coupling sections 5. More specifically, one oil case 37 is disposed under two gear coupling sections 5 which couple two input shafts of the sealed kneading apparatus 1 and two output shafts 19 of the drive apparatus 2 with each other. The oil case 37 is provided with legs 39 for supporting the oil case.

For the convenience of explanation, it is assumed that the right and left direction of the paper surface in FIGS. 4 and 5 is the transverse direction and the direction penetrating the paper surface in FIG. 5 is the longitudinal direction. In FIG. 6, the right and left direction of the paper surface is the longitudinal direction and the direction penetrating the paper surface is the transverse direction.

As shown in FIGS. 5 and 6, the oil case 37 is for soaking the gears 24 of the gear coupling sections 5 which overlie the oil case 37 into the lubricating oil 35 when the lubricating oil is stored into the oil case 37. Side walls 40 of the oil case 37 are erected from a bottom 41 up to a sufficient height which permits the gears 24 of the gear coupling sections 5 to be soaked into the lubricating oil 35.

More specifically, upper edges of front and rear side walls 40 (hereinafter may be referred to as "front and rear side walls 40A, 40B") and upper edges of left and right side walls 40 (hereinafter may be referred to as "left and right side walls 40C, 40D"), of the oil case 37, are each set at a at least higher position than the outer periphery portions of the first cylindrical bodies 25 which are the closest to the bottom 41 when seen in section.

The left and right side walls 40C, 40D of the oil case 37 are formed with arcuate cutout portions 43 for passing the input and output shafts 16, 19 therethrough. The cutout portions 43 are formed larger than the outside diameter of each input shaft 16 or output shaft 19 lest the shafts should interfere with the oil case 37 when coupling the input and output shafts 16, 19.

A cover 44 is mounted on an upper side of the oil case 37 so that it can be opened and closed. More specifically, one end of the cover 44 is pivotally connected to the rear side wall 40B of the oil case 37 through a hinge 45. In a closed state of the cover 44, the other end of the cover 44 is abutted against the front side wall 40A of the oil case 37.

The cover 44 is formed by forming a plate member in an arcuate shape and has left and right side walls each having arcuate cutout portions to prevent interference of the input shafts 16 or the output shafts 19 with the cover. The outer peripheries of the gear coupling sections 5, i.e., the outer peripheries of the second cylindrical bodies 26, are covered with the cover 44 and the side walls 40 of the oil case 37.

Further, the lubricating section 46 includes level detecting means 51 for detecting the level of the lubricating oil 35 stored in the oil case 37 and alarm means 52 which issues an alarm on the basis of the level of the lubricating oil 35 detected by the level detecting means 51.

The sensor (level detecting means) 51 is constituted by an electrostatic or magnetic level sensor. For example, two sensors 51 are provided in the rear side wall 40B of the oil case 37. An upper sensor 51A detects an upper limit (hereinafter may be referred to as "upper-limit level") of the level of the lubricating oil 35 stored within the oil case 37. A lower sensor 51B detects a lower limit (hereinafter may be referred to as "lower-limit level") of the lubricating oil level.

A lower-limit level D1 of the lubricating oil 35 indicates a limit position permitting the gears 24 of the gear coupling sections 5 to be soaked into the lubricating oil 35. For example, it is set to a vertical distance from the mountain portion of an internal tooth 33 closest to the bottom 41 of the oil case 37 to the bottom 41.

An upper-limit level D2 of the lubricating oil 35 indicates a limit position preventing leakage of the lubricating oil 35 from the oil case 37. For example, it is set to a vertical distance from a cutout portion 43 closest to the bottom 41 of the oil case 37 to the bottom 41.

The alarm means 52 is constructed so as to give an alarm using a buzzer or lamp or by display on a display unit. The alarm means 52 is constructed so as to give an alarm in accordance with a detection signal from a level detecting means, or a sensor, 51 when the level of the lubricating oil 35 is detected to have reached the upper-limit level D2 or the lower-limit level D1 by the sensor 51.

According to the above structure, when the amount of lubricating oil becomes too small and the oil level has reached the soaking limit for the gears 24 of the gear coupling sections 5, that is, when the oil level becomes coincident with the lower-limit level, this state is detected by the level detecting means 51 (51B) concerned and it is possible to inform a worker of this state through the alarm means 52.

When the amount of lubricating oil becomes too large and the oil level has reached the limit position capable of preventing leakage from the oil case 37, that is, when the oil level becomes coincident with the upper-limit level, this state is detected by the level detecting means 51 (51A) concerned and it is possible to inform a worker of this state through the alarm means 52.

Thus, it is possible to prevent the gears 24 of the gear coupling sections 5 from becoming soaked in the lubricating oil or prevent leakage of the lubricating oil from the oil case 37.

As to the level detecting means 51, there may be only the lower sensor 51B or a sensor which detects the distance to the level of the lubricating oil from above the oil level.

In addition to the above embodiment, it is preferable for each of the gear coupling sections 5 to have guide members 50 which not only draw up the lubricating oil stored in the oil case while rotating together with the gear coupling section, but also guide the lubricating oil for the gears of the gear coupling section 5.

As shown in FIG. 6, plural guide members 50 are provided on end faces of each gear coupling section (e.g., the second cylindrical bodies 26) in the circumferential direction. Each guide member 50 is formed in a shape which makes it possible to scoop up (draw up) the lubricating oil stored in the oil case 37. It is preferable that the shape of the guide members 50 of the left shaft has reflection symmetry relation with that of the guide members 50 of the right shaft.

Figure 7A:
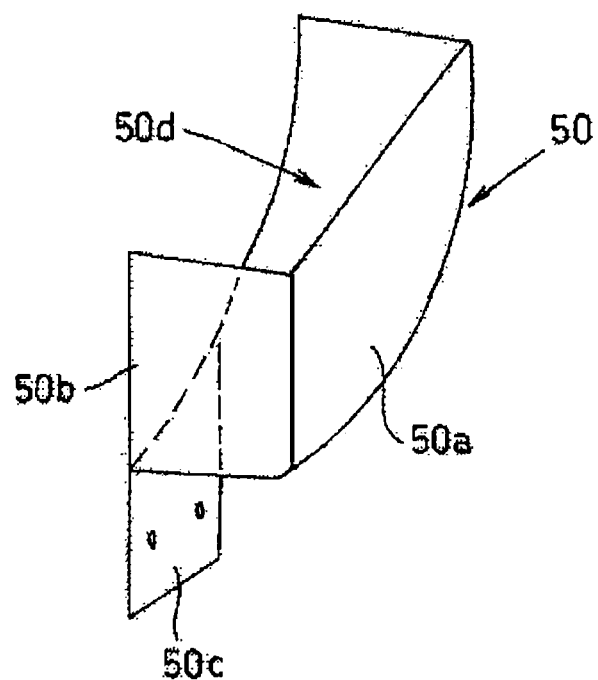
FIG. 7 is a perspective view of guide members.
Figure 7B:
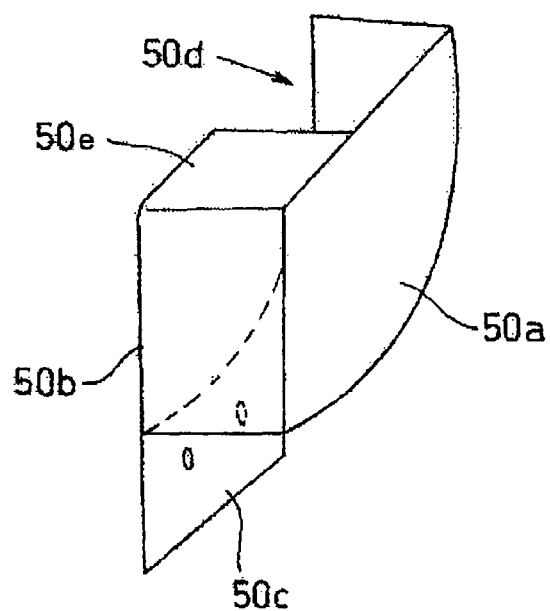

As shown in FIG. 7(*a*), each guide member 50 includes a vertical wall 50*a*, a lateral wall 50*b* projecting from the vertical wall 50*a*, and a mounting portion 50*c* projecting from the lateral wall 50*b* and mounted to an end face of each second cylindrical body 26.

In each guide member 50, upon rotation of the gear coupling sections 5, the lubricating oil is scooped up by a scoop-up portion 50*d* which is made up of the vertical wall 50*a* and the lateral wall 50*b* and the lubricating oil thus scooped up can be admitted to the internal teeth 33 and the external teeth 27. As shown in FIG. 7(*b*), each guide member 50 may be provided with a lid portion 50*e* which closes the rear side in the rotational direction. The guide members 50 may be attached to an end face of each first cylindrical body 25. The shape of the guide members 50 is not limited to wedge shape and reflection symmetry shape shown in the drawings, insofar as it can scoop up the lubricating oil and admit the thus-scooped up oil to the internal teeth 33 and the external teeth 27.

As shown in FIG. 5, it is preferable that the second cylindrical bodies 26 be each formed with a lubricating oil flowing hole 53, the lubricating oil flowing hole 53 being in communication with the first clearance 34 and capable of discharging the lubricating oil present in the associated gear coupling section 5. With the lubricating oil flowing hole 53, it is possible to prevent staying of the lubricating oil admitted into the gear coupling section 5 and effect smooth circulation of the lubricating oil both inside and outside the gear coupling section 5.

The present invention is not limited to the above embodiment.

In the above embodiment there is adopted an oil bath type wherein the lubricating oil 35 is stored in the oil case 37 and the gears 24 of the gear coupling sections 5 are soaked in the lubricating oil 35, but instead grease of a high viscosity may be applied to the gears 24 of the gear coupling sections 5 and a seal is provided in each inlet port 36 to prevent the grease from flowing out.

Although in the above embodiment the coupler 22 has thrust pins (thrust receiving portions) 22a, thrust receiving portions may be provided on the input shaft 16 side (plate 32 side) or the output shaft 19 side (plate 30 side).

Although in the above embodiment the sealed kneading apparatus 1 as an example of the stationary type to-be-driven apparatus and the stationary type drive apparatus 2 are coupled together by the coupling apparatus 6, the to-be-driven apparatus is not limited to the sealed kneading apparatus, but may be a double-arm type kneading apparatus or any other kneading apparatus. The present invention is also applicable to the case where there is provided only one output shaft 19 in the drive apparatus 2 and only one input shaft 16 in the to-be-driven apparatus 1.

The effects described above can be obtained if the axial lengths L1, L1', L2, L2' and L3 of the first cylindrical bodies 25, second cylindrical bodies 26 and coupler 22 are set shorter than the distance L0 between both end faces of the input and output shafts 16, 19 so that the first cylindrical bodies 25, second cylindrical bodies 26 and coupler 22 can be pulled out from both end faces. If the plates 30 and 32 are an obstacle to pulling out the first and second cylindrical bodies 25, 26 and the coupler 22, it is preferable that the plates 30 and 32 be omitted or be minimized in thickness.

Although in the above embodiment the plate 30 is attached to the first cylindrical body 25, it may be attached to the output shaft 19. Likewise, although the plate 32 is attached to the input shaft 16, it may be attached to the first cylindrical body 25.

The following description is now provided about conventional techniques related to the embodiment described above.

Heretofore, as a sealed kneading apparatus for kneading a material such as, for example, rubber or plastic, one disclosed in Japanese Patent Laid-Open Publication No. Hei 10 (1998)-44145 (hereinafter referred to as "Patent Literature 1") has been known. This sealed conventional kneading apparatus is driven by a drive apparatus disposed near the kneading apparatus.

More particularly, an externally projecting input shaft is provided in the sealed kneading apparatus and an externally projecting output shaft is provided in the drive apparatus. The input shaft in the sealed kneading apparatus and the output shaft in the drive apparatus are coupled together by a coupling apparatus such as a flange coupling. With this coupling, the sealed kneading apparatus can be driven.

In case of coupling the sealed kneading apparatus and the drive apparatus with each other, if the input shaft of the sealed kneading apparatus and the output shaft of the drive apparatus are eccentric to (axially misaligned) each other, both shafts cannot be coupled by the coupling apparatus. Therefore, an extremely high accuracy of positioning (alignment) has been absolutely necessary when installing the sealed kneading apparatus and the drive apparatus.

In Japanese Patent Laid-Open Publication No. 2004-313927 (hereinafter referred to as "Patent Literature 2") there is disclosed a technique wherein a double-arm type kneading apparatus and a drive apparatus are coupled together by a coupling apparatus comprising a gear coupling section.

It is presumed that by coupling the input shaft of the sealed kneading apparatus and the output shaft of the drive apparatus through the coupling apparatus comprising a gear coupling section with use of the technique disclosed in Patent Literature 2, the coupling can be done relatively easily even if both input shaft and output shaft are in a slightly eccentric (axially misaligned) state of about a degree corresponding to the machining tolerance in the manufacture of the apparatus.

However, in the case where the input shaft of the sealed kneading apparatus and the output shaft of the drive apparatus are coupled together in an intentionally eccentric state, i.e., in an eccentric state independent of a machining error, and such a large power as in the sealed kneading apparatus is transmitted to those shafts in the eccentric state, with use of the technique disclosed in Patent Literature 2, there is no denying the fact that the gears in the gear coupling section rotate in a state of overload. As a result, there arises the problem that there occurs seizing or the like of the gears and the life of the gear coupling section becomes very short.

In view of the above-mentioned problem the embodiment of the present invention described above aims at providing a coupling apparatus of a long life capable of coupling an input shaft of a batch type kneading apparatus typical of which is a sealed kneading apparatus and an output shaft of a drive apparatus with each other in a mutually eccentric state, further providing a batch type kneading apparatus and a drive apparatus each provided with the coupling apparatus, and kneading equipment comprising a batch type kneading apparatus and a drive apparatus both coupled together through the coupling apparatus.

More specifically, for achieving the above-mentioned object, according to the above embodiment there is provided a coupling apparatus for coupling between an input shaft of a to-be-driven apparatus and an output shaft of a drive apparatus for driving the to-be-driven apparatus, the coupling apparatus comprising a gear coupling section and a lubricating section, the gear coupling section having at least a pair of gears meshing with each other so as to permit transfer of a driving force from the output shaft to the input shaft in a mutually eccentric state of the input shaft and the output shaft, the lubricating section being capable of supplying a lubricant between the gears, the gears being in mesh with each other so as to slide relatively in a face width direction with rotation of the input shaft.

According to this coupling apparatus, the input shaft and the output shaft can be coupled together by the gear coupling section even in a mutually eccentric state of both shafts. Further, since a lubricant is supplied between the gears in the gear coupling section, even if a large power is transmitted to the input shaft and the output shaft in a mutually eccentric state of both shafts, seizing or the like of the gears no longer occurs and hence it is possible to prevent shortening of the life.

An example of the to-be-driven apparatus may be a kneader.

Preferably, the lubricating section includes an oil case which underlies the gear coupling section to store lubricating oil as the lubricant, and the gears are soaked in the lubricating oil stored in the oil case to effect oil bath lubrication. In this case, the gears are constantly soaked in the lubricating oil because they are lubricated by the oil bath method. Consequently, the occurrence of seizing or the like of the gears can be prevented more surely.

Preferably, a cover which together with the oil case covers an outer periphery side of the gear coupling section is mounted to an upper side of the oil case so that it can be opened and closed.

By thus covering the gear coupling section with both cover and oil case, the role of a safety cover can be exhibited by both members and splashing of the lubricating oil from the interior of the oil case to the exterior can also be prevented by the cover. In comparison with the case where the safety cover and the oil case are provided separately, it is possible to use parts in common and hence possible to reduce the cost.

Preferably, the gear coupling section comprises a pair of first cylindrical bodies, the pair of first cylindrical bodies being fitted respectively on the input shaft of the to-be-driven apparatus and the output shaft of the drive apparatus and having first gears respectively on outer periphery surfaces thereof, a pair of second cylindrical bodies, the pair of second cylindrical bodies being loosely fitted on the pair of first cylindrical bodies and having second gears respectively on inner surfaces thereof, the second gears meshing with the pair of first gears respectively, and a coupler for coupling the second cylindrical bodies with each other detachably, an axial length of each of the second cylindrical bodies and that of the coupler being each set shorter than the distance between an end face of the input shaft and that of the output shaft so that the second cylindrical bodies and the coupler can be pulled out from between the end faces.

According to this structure, even in a state in which the batch type kneading apparatus and the drive apparatus are fixed to respective predetermined positions, the second cylindrical bodies and the coupler can be pulled out from the input shaft or the output shaft and thus the second cylindrical bodies can be replaced in a very simple manner.

Preferably, the gear coupling section includes a guide member for scooping up the lubricating oil stored in the oil case and conducting the oil to the gears in the gear coupling section while rotating in accordance with drive of the output shaft of the drive apparatus.

According to this structure it is possible to positively prevent deficient lubrication of the gears of the gear coupling section.

Preferably, the lubricating section includes level detecting means for detecting the level of the lubricating oil stored in the oil case and alarm means for giving an alarm when the oil level detected by the level detecting means has become lower than a predetermined value.

According to this structure, the level of the lubricating oil in the oil case can always be monitored and, in terms of an alarm, it is possible to inform for example a worker of the state that the amount of the lubricating oil in the oil case has become small.

In the kneading apparatus including the coupling apparatus it is preferable that the gear coupling section be provided for each of input shafts corresponding respectively to two rotors which are for kneading a to-be-kneaded material within a kneading chamber.

In the drive apparatus including the coupling apparatus it is preferable that the gear coupling section be provided for each of two output shafts provided in the drive apparatus.

According to the above embodiment there also is provided kneading equipment, the kneading equipment comprising a kneading apparatus having two input shafts, a drive apparatus having two output shafts corresponding to the two input shafts respectively, and the coupling apparatus, and having the gear coupling sections disposed respectively between the corresponding input shafts and output shafts.

The following description is now provided about another conventional technique related to the above embodiment.

Heretofore, as a kneading apparatus for kneading a material such as, for example, rubber or plastic, one disclosed in the foregoing Patent Literature 2 (Japanese Patent Laid-Open Publication No. 2004-313927) has been known. This conventional kneading apparatus is a double-arm type and is driven by a drive apparatus disposed near the kneading apparatus.

More particularly, the kneading apparatus is provided with an externally projecting input shaft and the drive apparatus is provided with an externally projecting output shaft, both shafts being coupled together by a coupling apparatus having a gear coupling section. With this coupling, the kneading apparatus is driven.

For coupling the kneading apparatus and the drive apparatus with each other, both apparatus are fixed onto an installation surface so that the respective input and output shafts are close to each other, then both shafts thus made close to each other are coupled together by the coupling apparatus.

In the conventional coupling apparatus there sometimes is a case where replacement of the gear coupling section is required due to wear of the gears in the gear coupling section.

According to the structure of the kneading apparatus, however, when replacing the gear coupling section, the gear coupling section cannot be removed in a state in which the input shaft and the output shaft are close to each other. In this case, it is required to once move at least one of the kneading apparatus and the drive apparatus axially, thereby keeping the input shaft and the output shaft away from each other, and then remove the gear coupling section from both shafts. Thus, the replacing work has so far been very troublesome. The work for restoring the kneading apparatus or the drive apparatus completely to the original position has also been very troublesome.

In view of the above-mentioned problems the foregoing embodiment aims at providing a coupling apparatus which permits easy replacement of a gear coupling section even without moving a to-be-driven apparatus such as a kneading apparatus or a drive apparatus, as well as kneading equipment with a kneading apparatus and a drive apparatus coupled together through the coupling apparatus.

More specifically, according to the foregoing embodiment there is provided a coupling apparatus having a gear coupling section for coupling an output shaft of a drive apparatus and an input shaft of a to-be-driven apparatus with each other, the gear coupling section comprising a pair of first cylindrical bodies, the pair of first cylindrical bodies being fitted respectively on the input shaft of the to-be-driven apparatus and the output shaft of the drive apparatus and having first gears respectively on outer periphery surfaces thereof, a pair of second cylindrical bodies, the pair of second cylindrical bodies being loosely fitted on the pair of first cylindrical bodies and having second gears respectively on inner surfaces thereof, the second gears meshing with the pair of first gears respectively, and a coupler for coupling the second cylindrical bodes with each other detachably, an axial length of each of the second cylindrical bodies and that of the coupler being each set shorter than the distance between an end face of the input shaft and that of the output shaft so that the second cylindrical bodies and the coupler can be pulled out from between the end faces.

According to this structure the second cylindrical bodies and the coupler can be pulled out in a state in which the to-be-driven apparatus and the drive apparatus are fixed to respective predetermined position, without moving the to-be-driven apparatus or the drive apparatus, and thus the second cylindrical bodies can be replaced in a very simple manner. In other words, the second cylindrical bodies can be replaced without changing a relative position between the to-be-driven apparatus and the drive apparatus and it is not necessary to perform re-positioning of both apparatus.

Preferably, an axial length of each of the first cylindrical bodies is set shorter than the distance between an end face of the input shaft and that of the output shaft so that the first cylindrical bodies can be pulled out from between both end faces.

According to this structure, even without moving the kneading apparatus or the drive apparatus, the first cylindrical bodies can be pulled out and thus can be replaced in a very simple manner.

Preferably, an axial length of each of the second cylindrical bodies is set shorter than the distance between an end face of the input shaft and that of the output shaft so that the first cylindrical bodies can be pulled out from between both end faces.

Preferably, the hardness of the second gears is set lower than that of the first gears.

Consequently, wear of the first gears of the first cylindrical bodies is suppressed in comparison with that of the second gears of the second cylindrical bodies, whereby the replacement frequency of the first cylindrical bodies can be decreased.

Preferably, crest portions of the first gears are each formed curvilinearly in the face width direction so that the first gears and the second gears meshing with the first gears become relatively slidable in the face width direction with rotation of the output shaft.

According to the foregoing embodiment there is further provided kneading equipment, the kneading equipment comprising a kneading apparatus, the kneading apparatus having the input shaft and being one of to-be-driven apparatus, the drive apparatus having an output shaft corresponding to the input shaft, and the coupling apparatus, the coupling apparatus having the gear coupling section disposed between the corresponding input shaft and output shaft.

Preferably, the kneading apparatus has two input shafts, the drive apparatus has two output shafts corresponding to the two input shafts respectively, and the gear coupling section is provided for each of one corresponding pair of the input and output shafts and the other corresponding pair of the input and output shafts.

INDUSTRIAL APPLICABILITY

According to the present invention, an input shaft of a to-be-driven apparatus and an output shaft of a drive apparatus can be coupled together in a mutually eccentric state of both shafts and the apparatus life can be prolonged.

Moreover, according to the present invention it is possible to replace the gear coupling section in a simple manner even without moving the to-be-driven apparatus such as, for example, a kneading apparatus or the drive apparatus.

What is claimed is:

1. A coupling apparatus for coupling between an input shaft of a to-be-driven apparatus and an output shaft of a drive apparatus for driving said to-be-driven apparatus, said coupling apparatus comprising:
a gear coupling section, wherein said gear coupling section comprises a pair of first cylindrical bodies, said pair of first cylindrical bodies being fitted on said input shaft of said to-be-driven apparatus and said output shaft of said drive apparatus respectively and having first gears on outer periphery surfaces thereof respectively, a pair of second cylindrical bodies, said pair of second cylindrical bodies being loosely fitted on said pair of first cylindrical bodies to define a clearance therebetween and having second gears on inner surfaces thereof respectively, said second gears meshing with said pair of first gears respectively, a lubricating oil flowing hole extending through said second cylindrical bodies, and a coupler detachably connected to each of said second cylindrical bodies for detachably coupling said second cylindrical bodies with each other, wherein the second cylindrical bodies respectively overlap the input shaft and the output shaft when the coupler is connected to said second cylindrical bodies; and
a lubricating section capable of supplying a lubricant between said gears, wherein said lubricating section includes an oil case underlying said gear coupling section to store lubricating oil as said lubricant, and said gears are immersed in the lubricating oil stored in said oil case and are thus lubricated in an oil bath, wherein lubricating oil in the clearance can flow to the oil case and lubricating oil in the oil case can flow to the clearance via said lubricating oil flowing hole, said gears being in mesh with each other so as to slide relatively in a face width direction with rotation of said input shaft, wherein said lubricating oil flowing hole is provided at an axial mid-portion of each of said second cylindrical bodies, and wherein said axial mid-portion axially overlaps said first cylindrical body.

2. A coupling apparatus according to claim 1, wherein said to-be-driven apparatus is a kneader for kneading a specific material to be kneaded.

3. A coupling apparatus according to claim 1, wherein a cover which together with said oil case covers an outer periphery side of said gear coupling section is mounted to an upper side of said oil case so that it can be opened and closed.

4. A coupling apparatus according to claim 1, wherein said gear coupling section includes a guide member for scooping up the lubricating oil stored in said oil case and conducting the oil to said gears in said gear coupling section while rotating in accordance with drive of said output shaft of said drive apparatus.

5. A coupling apparatus according to claim 1, wherein said lubricating section includes level detecting means for detecting the level of the lubricating oil stored in said oil case and alarm means for giving an alarm when the oil level detected by said level detecting means has become lower than a predetermined value.

6. A kneading apparatus including said coupling apparatus described in claim 2, wherein said gear coupling section is provided for each of said input shafts corresponding respectively to two rotors for kneading a to-be-kneaded material within a kneading chamber.

7. A drive apparatus including said coupling apparatus described in claim 1, wherein said gear coupling section is provided for each of said two output shafts provided in said drive apparatus.

8. Kneading equipment comprising a kneading apparatus having two input shafts, a drive apparatus having two output shafts corresponding to said two input shafts respectively, and said coupling apparatus described in claim 2 and having said gear coupling sections disposed between said corresponding input shafts and output shafts respectively.

9. Kneading equipment comprising a kneading apparatus, said kneading apparatus having said input shaft and being one of said to-be-driven apparatus, said drive apparatus having said output shaft corresponding to said input shaft, and said coupling apparatus described in claim 1, said coupling apparatus having said gear coupling section disposed between said corresponding input shaft and output shaft.

10. Kneading equipment according to claim 9, wherein said kneading apparatus has two input shafts, said drive apparatus has two output shafts corresponding to said two input shafts respectively, and said gear coupling section is provided for each of one corresponding pair of said input and output shafts and the other corresponding pair of said input and output shafts.

11. A coupling apparatus according to claim 1, wherein an axial length of each of said second cylindrical bodies and that of said coupler are each set shorter than the distance between an end face of said input shaft and that of said output shaft so that said second cylindrical bodies and said coupler can be pulled out from between both said end faces.

* * * * *